(12) United States Patent  (10) Patent No.: US 8,460,039 B2
Akuta  (45) Date of Patent: Jun. 11, 2013

(54) TERMINAL BLOCK AND METHOD OF MANUFACTURING IT

(75) Inventor: Daisuke Akuta, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 13/293,240

(22) Filed: Nov. 10, 2011

(65) Prior Publication Data

US 2012/0190251 A1    Jul. 26, 2012

(30) Foreign Application Priority Data

Jan. 20, 2011  (JP) .................................. 2011-010058

(51) Int. Cl.
 *H01R 9/22* (2006.01)
(52) U.S. Cl.
 USPC ............................................ 439/722; 29/848
(58) Field of Classification Search
 USPC .................... 439/709, 722; 29/848
 See application file for complete search history.

(56) References Cited

U.S. PATENT DOCUMENTS

| 4,630,882 | A | * | 12/1986 | Naylor et al. | 439/444 |
| 4,804,340 | A | * | 2/1989 | Hamer et al. | 439/709 |
| 8,142,234 | B2 | * | 3/2012 | Kaneshiro | 439/709 |
| 2012/0186872 | A1 | * | 7/2012 | Akuta | 174/70 B |
| 2012/0190232 | A1 | * | 7/2012 | Akuta | 439/487 |
| 2012/0190251 | A1 | * | 7/2012 | Akuta | 439/722 |
| 2012/0223601 | A1 | * | 9/2012 | Akuta | 310/58 |
| 2012/0225593 | A1 | * | 9/2012 | Akuta | 439/722 |

FOREIGN PATENT DOCUMENTS

| JP | 2008-098007 | 4/2008 |
| JP | 2009-281518 | 12/2009 |

* cited by examiner

*Primary Examiner* — Ross Gushi
(74) *Attorney, Agent, or Firm* — Gerald E. Hespos; Michael J. Porco; Matthew T. Hespos

(57) ABSTRACT

A terminal block has nuts (10), each with a step (12) slightly recessed and formed at an outer peripheral part of an upper fastening surface (10A) on which conductors are to be placed. A heat sink (40) is arranged below the nuts (10) and an insulating plate (20) is sandwiched between the nuts (10) and the heat sink (40). Resin (60) is molded around these three kinds of members (10, 20, 40). The steps (12) are pressed by resin cut-off parts (73) provided in a first mold (71) for the resin (60). Restricted surfaces (12A) at outer peripheral sides of press surfaces (12B) to be pressed by the resin cut-off parts (73) on the steps (12) are covered by the molded resin (60).

14 Claims, 17 Drawing Sheets

TERMINAL BLOCK AND METHOD OF MANUFACTURING IT

BACKGROUND OF THE INVENTION

1. Field of the Invention

The invention relates to a terminal block, a method of manufacturing or producing it and a nut.

2. Description of the Related Art

Japanese Unexamined patent publication No. 2008-98007, discloses a terminal block for electrically connecting conductors, such as busbars, extending from electrical devices, such as a motor and an inverter. Conductors of the respective electrical devices are placed one above another on nuts insert molded into a resin terminal block main body. Bolts then are tightened into the nuts to fasten and electrically connect the conductors.

The electrical devices generally generate heat and the conductors become hot. Thus, a metal heat sink is arranged below the nuts via a flat plate-shaped insulating member made of synthetic resin. Thus, heat transferred from the conductors to the nuts is transferred to the heat sink via the insulating member and is radiated from the heat sink. The conductors are placed on fastening surfaces of the terminal block. The fastening surfaces are pressed from above by a cut-off part of a mold during the insert molding process to achieve a resin cut-off that prevents the resin from covering the fastening surfaces.

Pressing forces exerted by the resin cut-off parts are distributed over the entire fastening surfaces to reduce contact pressures of the resin cut-off parts acting on the fastening surfaces. However, small clearances may be formed at parts of boundaries between the resin cut-off parts and the fastening surfaces. The resin flows into these clearances and is cured there to produce resin films on the fastening surfaces that prevent the conductors and the nuts from being held in direct contact. This absence of direct contact reduces heat-transfer efficiency and heat radiation performance of the terminal block. Pressing forces of the resin cut-off parts can be increased to cut off the resin more reliably. However, higher pressing forces may fracture the insulating member or damage the fastening surfaces to reduce contact areas with the busbars.

The invention was completed in view of the above situation and an object thereof is to improve heat radiation performance of a terminal block.

SUMMARY OF THE INVENTION

The invention relates to a terminal block that includes at least one nut with a fastening surface. Conductors extending from one or more devices are placed one over another on the fastening surface and are fastened by a bolt. A step is formed at an outer periphery of the fastening surface and is recessed away from the conductors. At least one heat sink is arranged on a side of the nut opposite the fastening surface and at least one insulating plate is sandwiched in close contact between the nut and the heat sink. The insulating plate transfers heat of the conductors from the nut to the heat sink. Resin is molded around parts of the nut, the insulating plate and the heat sink. The step includes a press surface that is pressed by at least one resin cut-off part in a mold that forms the molded resin. A restricted surface is substantially flush with the press surface and is continuous with an outer periphery of the press surface on the step. The restricted surface is covered by the molded resin.

The step may be formed around an outer periphery of the fastening surface.

The step may be pressed over the entire periphery by the resin cut-off part.

The resin cut-off part presses the entire periphery of the step of the nut. Thus, contact pressure of the resin cut-off part on the step can be increased without increasing a pressing force. Accordingly, resin is cut off reliably at a boundary between the resin cut-off part and the step to prevent the resin from adhering to the fastening surface of the nut.

The step is recessed from the fastening surface of the nut and away from the conductors. Thus, the engagement of the resin cut-off part with the step cannot damage the fastening surface in a way that would reduce a contact area with the conductors. A processing error of the nut could create a small clearance between the resin cut-off part and the step and resin could flow into this clearance. However, the step is recessed away from the conductors and is at a different height position than the fastening surface. Thus, resin is not likely to flow onto the fastening surface of the nut and a resin film is not likely to be formed. Accordingly, heat radiation performance of busbars and the terminal block is improved by efficiently transferring heat of the busbars to the nut.

The molded resin covers the restricted surface on the step and prevents the nut from being pulled toward the bolt. Thus, an air layer with a lower thermal conductivity than metals and synthetic resins will not be formed between the nut and the insulating plate when the bolt is tightened into the nut. In this way, the nut closely contacts the insulating plate and heat easily escapes from the nut to the heat sink via the insulating plate. As a result, the terminal block exhibits good heat-transfer performance.

The restricted surface of the step is continuous and flush with the outer periphery of the press surface and is covered by the molded resin. Thus, the nut has a simple shape as compared with the case where the press surface and the restricted surface are at different heights.

The molded resin may include an upper cover that covers the restricted surface of the step from above, a lower cover that covers a lower end of the heat sink from below, and a side wall connecting the upper and lower covers. The upper and lower covers sandwich the nut, the insulating plate and the heat sink while holding the nut, the insulating plate and the heat sink in close contact. This construction also prevents an upward movement of the molded resin and the nut toward the bolt.

The step may be configured to achieve surface contact with the resin cut-off part of the mold. This construction reliably cuts the resin off where the resin cut-off part engages the step. Hence, a resin film will not form on the upper surface of the nut and the conductors can be held in close contact with the nut.

The resin cut-off part may have a horizontal leading end surface at an angle, and preferably a right angle to an opening direction of the mold.

The leading end surface of the resin cut-off part and the upper surface of the step could be oblique surfaces. However, these oblique surfaces may not achieve surface contact with each other if the nut is displaced even to a small extent. Accordingly, the step preferably has a horizontal upper surface that comes into surface contact with the leading end surface of the resin cut-off part. Additionally, a clearance may be formed between a side surface of the resin cut-off part and a side surface of the nut while the leading end surface of the resin cut-off part is held in surface contact with the press surface of the step. With this construction, the leading end surface of the resin cut-off part can achieve surface contact with the upper surface of the step of the nut and the resin can be reliably cut off even if the nut is displaced slightly in a horizontally direction.

The invention also relates to a nut, such as a nut for use with the above-described terminal block. The nut has a fastening surface and a step at an outer periphery of the fastening surface. The step is recessed from the fastening surface. A molded resin can engage part of the step to prevent the nut from being pulled toward a bolt that threadedly engages the nut. The step also can engage a resin cut-off part to prevent resin from flowing onto the fastening surface when the resin is molded around the nut. The invention also relates to a method of manufacturing a terminal block, such as the above-described terminal block in which conductors extending from one or more devices are placed one over another and fastened by a bolt. The method includes providing at least one nut with a fastening surface on which the conductors are to be placed and at least one step at an outer periphery of the fastening surface and recessed from the fastening surface. The method continues by arranging at least one insulating plate in close contact with a surface of the nut opposite the fastening surface. The method proceeds by arranging at least one heat sink on a side of the insulating plate opposite the nut. These parts then are placed in a mold, and a resin cut-off part of the mold is pressed against a press surface of the step inward from an outer periphery of the nut so that a restricted surface is defined between the resin cut-off part and the outer periphery of the nut (10). The method then molds resin around at least portions of the insulating plate, the heat sink, the outer periphery of the nut and the restricted surface of the nut.

The stepped portion may be formed at an outer peripheral part of the fastening surface over the entire periphery, and the method may include pressing the step over the entire periphery by the at least one resin cut-off part.

The step of molding the resin may include forming an upper cover that covers the restricted surface of the step, forming a lower cover that covers a portion of the heat sink opposite the nut, and forming a side wall connecting the upper and lower covers.

The nut, the insulating plate and the heat sink may be sandwiched from opposite sides by the upper and lower covers while being held in close contact.

The resin cut-off part may be brought into surface contact with the step.

The resin cut-off part may have a leading end surface at an angle to an opening direction of the mold and preferably substantially perpendicular to a mold opening direction. The method then may include bringing the leading end surface of the resin cut-off part into surface contact with the press surface of the step, while leaving a clearance between the resin cut-off part and a side surface of the nut when the leading end surface of the resin cut-off part is held against the press surface of the step.

These and other objects, features and advantages of the present invention will become more apparent upon reading of the following detailed description of preferred embodiments and accompanying drawings.

DETAILED DESCRIPTION OF THE PREFERRED EMBODIMENTS

A terminal block in accordance with the invention is mounted in a motor case to be installed in a vehicle, such as an electric vehicle or a hybrid vehicle, and is provided to electrically connect a busbar of a first electric equipment, such as an electric motor (e.g. a three-pole busbar provided in a three-phase alternating current motor) and a busbar of a second electric equipment such as an inverter (e.g. a three-pole busbar provided in an inverter).

Figure 2:
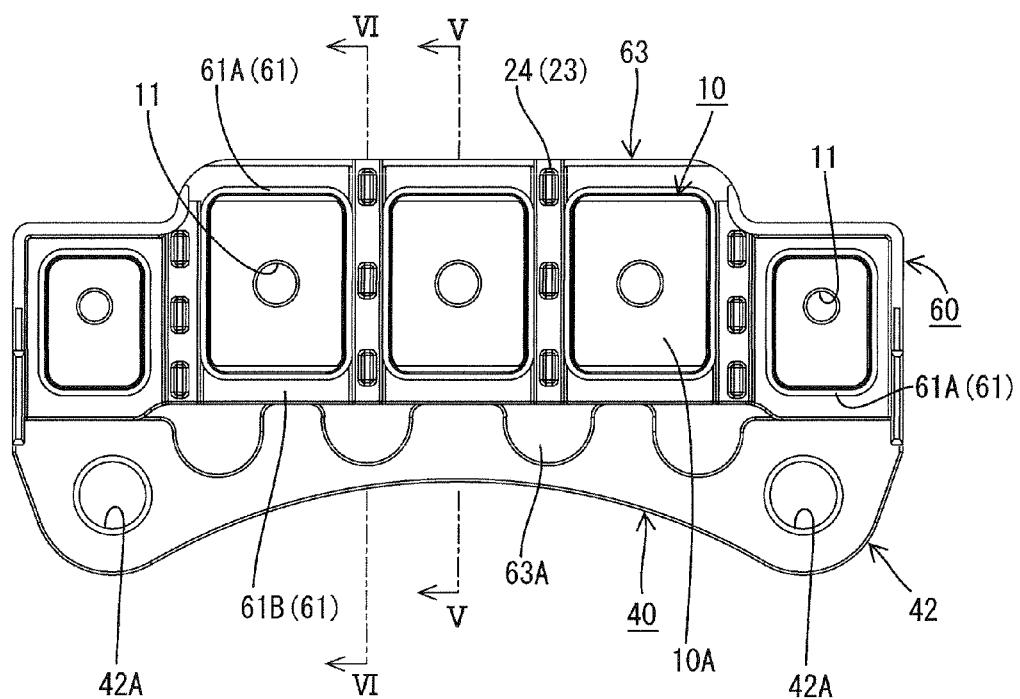
FIG. 2 is a plan view of the terminal block.

The terminal block includes nuts 10, each of which upper and lower surfaces. Unillustrated busbars extending from electrical devices are to be placed on the upper surfaces of the nuts 10. An insulating plate 20 is placed on the lower surface of the nut 10. A heat sink 40 is arranged adjacent a surface of the insulating plate 20 opposite the nuts 10. Thus, the insulating plate 20 is sandwiched vertically between the nuts 10 and the heat sink 40. Synthetic resin 60 then is molded to at least partly covering the nuts 10, the insulating plate 20 and the heat sink 40. In the following description, a vertical direction is based on a vertical direction in FIG. 5 and a lateral direction is based on a lateral direction in FIG. 2.

Figure 7:
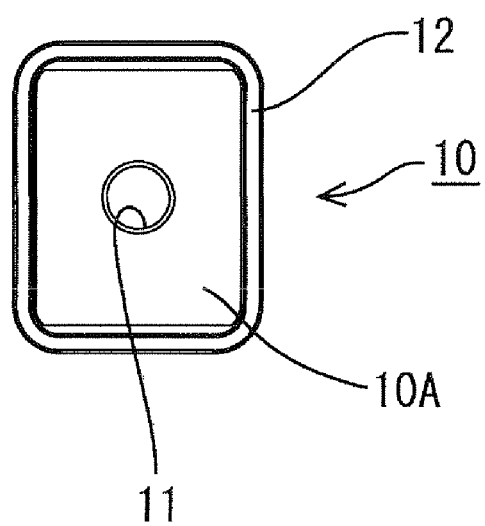
FIG. 7 is a plan view of a nut.
Figure 13:
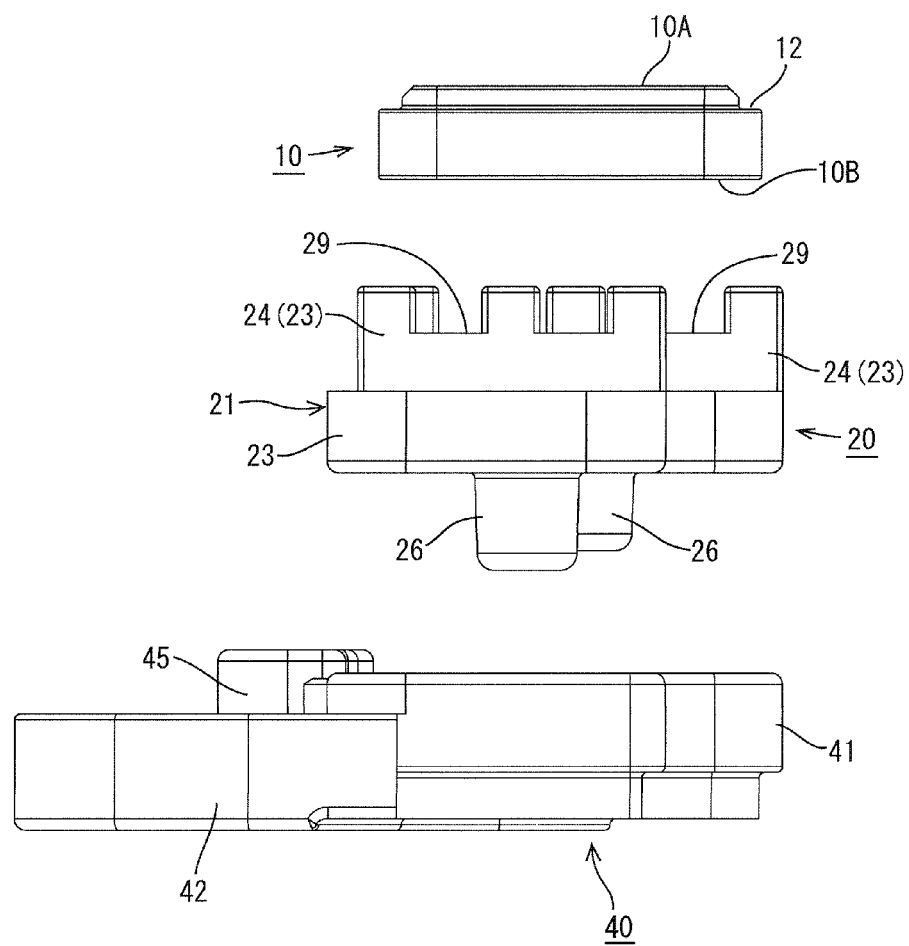
FIG. 13 is a side view showing a state before the nuts, the insulating plate and the heat sink are assembled.

Each nut 10 is a substantially rectangular metal block with rounded corners, as shown in FIGS. 7 and 13. Each nut 10 has opposite upper and lower fastening surfaces 10A and 10B and a bolt tightening hole 11 penetrates each nut 10 substantially perpendicularly between the fastening surfaces 10A, 10B in a central part of the nut 10. A plurality of unillustrated busbars are to be placed on the upper fastening surface 10A of the nut 10 and an unillustrated bolt is screwed into the bolt tightening hole 11 for electrically conductively connecting the busbars.

Figure 5:
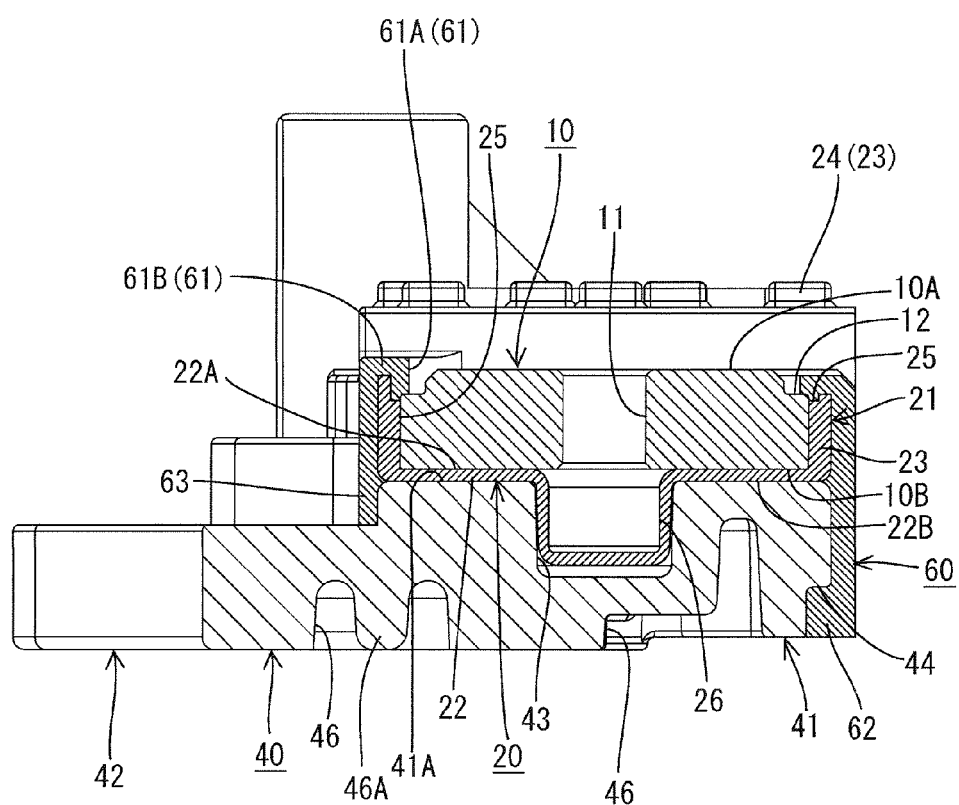
FIG. 5 is a section along V-V of FIG. 2.

A step 12 is formed on the outer peripheral edge of an upper end portion of the nut 10 and is slightly lower than the upper fastening surface 10A of the nut 10, as shown in FIG. 5. The step 12 is provided over substantially the entire outer peripheral edge of the nut 10 and is parallel to the upper and lower fastening surfaces 10A, 10B of the nut 10. Note that the upper and lower fastening surfaces 10A, 10B and the step 12 of the nut 10 are flat without irregularity.

Figure 8:
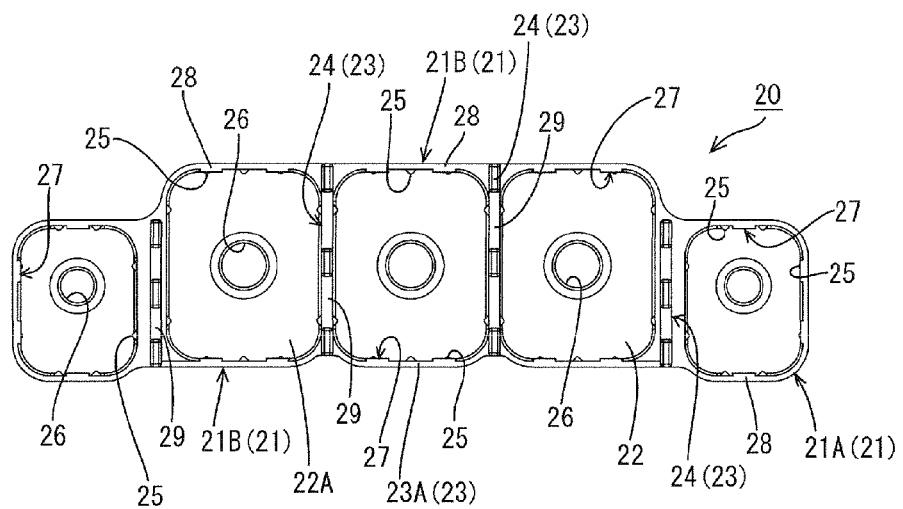
FIG. 8 is a plan view of an insulating plate.

The insulating plate 20 is made of an insulating material, such as synthetic resin, and, as shown in FIG. 8, is long in the lateral direction. The insulating plate 20 functions to transfer heat of the busbars placed on the nuts 10 from the nuts 10 to the heat sink 40 located below the nuts 10. Note that the synthetic resin used here particularly has a content of glass and talc between about 50% and 75% (e.g. of about 66%) and/or thermal conductivity is higher than synthetic resin having a content of glass and talc of about 33%. This enables heat to be transferred efficiently from the nuts 10 to the heat sink 40.

The insulating plate 20 includes nut accommodating recesses 21 arranged side by side in the lateral direction and accommodating the respective nuts 10.

As shown in FIG. 5, each nut accommodating recess 21 includes a base plate 22 that closely accommodates the lower fastening surface 10B of the nut 10 and a surrounding wall 23 that stands up from the base plate 22 to surround side surfaces of the nut 10 over substantially the entire periphery. Accordingly, the nut accommodating recess 21 has a rectangular open upper end with (e.g. four) rounded corners. The respective nut accommodating recesses 21 are formed substantially side by side so that longer sides thereof are adjacent to each other. The nut accommodating recesses 21 located at the opposite sides in the lateral direction are smaller nut accommodating recesses 21A and three larger nut accommodating recesses 21B located in a central part.

Figure 10:
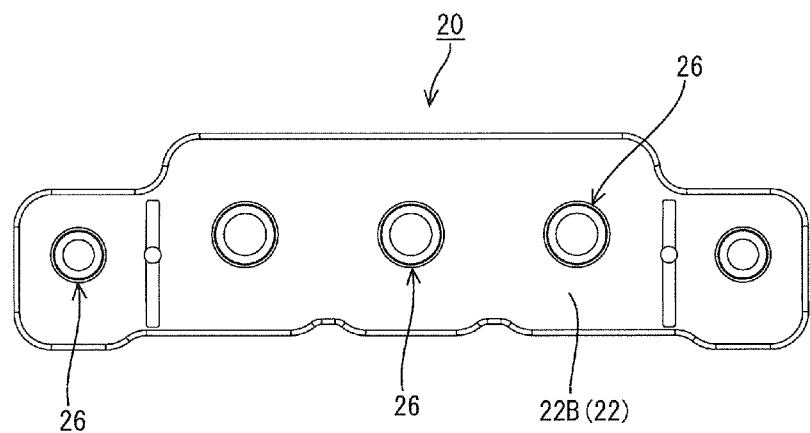
FIG. 10 is a bottom view of the insulating plate.

As shown in FIG. 10, one unitary bottom plate 22 common to all the nut accommodating recesses 21 is provided, and both upper and lower surfaces 22A, 22B of the bottom plate 22 are flat. Thus, the upper surface 22A of the bottom plate 22 in the respective nut accommodating recesses 21 and the lower fastening surfaces 10B of the nuts 10 are held closely in contact without any clearances and with the nuts 10 accommodated in the nut accommodating recesses 21 as shown in FIG. 5. In this way, heat can be transferred efficiently from the nuts 10 to the bottom plate 22.

Figure 14:
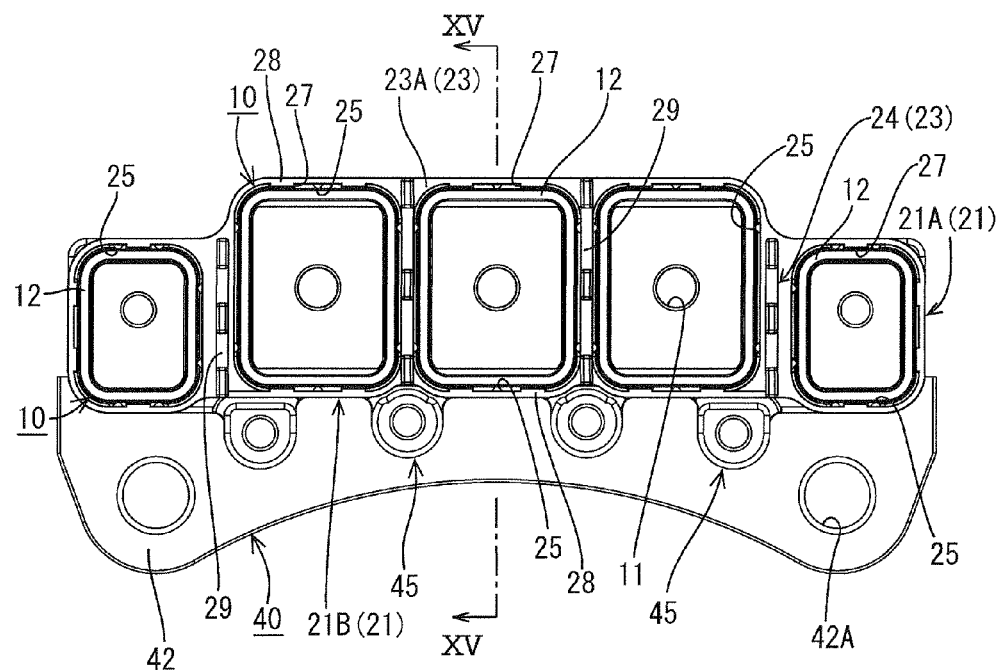
FIG. 14 is a plan view showing a state after the nuts, the insulating plate and the heat sink are assembled.

As shown in FIG. 8, the inner peripheral surfaces of the surrounding walls 23 have substantially rectangular shapes and substantially conform to the outer peripheral surfaces of the nuts 10. However, the inner peripheral surfaces of the surrounding walls 23 are slightly larger than the outer peripheral surfaces of the nuts 10 so that the nuts 10 can be accommodated in the nut accommodating recesses 21 with small clearances formed between the inner peripheral surfaces of the surrounding walls 23 and the side surfaces of the nut 10, as shown in FIG. 14.

Figure 9:
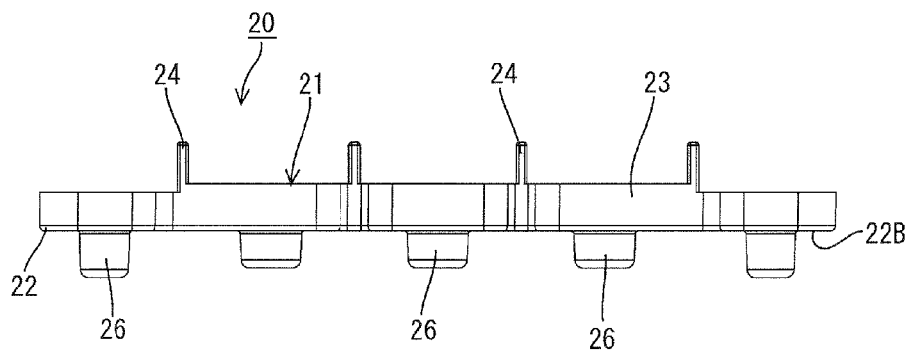
FIG. 9 is a rear view of the insulating plate.

The surrounding wall 23 between adjacent nut accommodating recesses 21 defines a partition wall 24 that partitions the two nuts 10 accommodated in the respective nut accommodating recesses 21. Remaining parts of the surrounding wall 23 define an outer surrounding wall 23A. As shown in FIG. 9, the partition wall 24 is about twice the height of the outer surrounding walls 23A to ensure a creepage distance between adjacent nuts 10. Additionally, the partition walls 24 are higher than the busbars placed on the upper fastening surfaces 10A of the nuts 10. Thus, the busbars particularly will not contact each other and short-circuit due to lateral movements of the busbars on the nuts 10.

Further, as shown in FIG. 8, substantially rectangular pressing projections 27 project from the respective inner peripheral surfaces of the outer surrounding walls 23A.

One pressing projection 27 is provided on the inner peripheral surface of the each shorter side of the surrounding wall 23 of each smaller nut accommodating recess 21A and two spaced apart pressing projections 27 are provided on the inner peripheral surface of the longer side of the surrounding wall 23 of each smaller nut accommodating recess 21A and the inner peripheral surface of each shorter side of the surrounding wall 23 of the each larger nut accommodating recess 21B.

Figure 17:
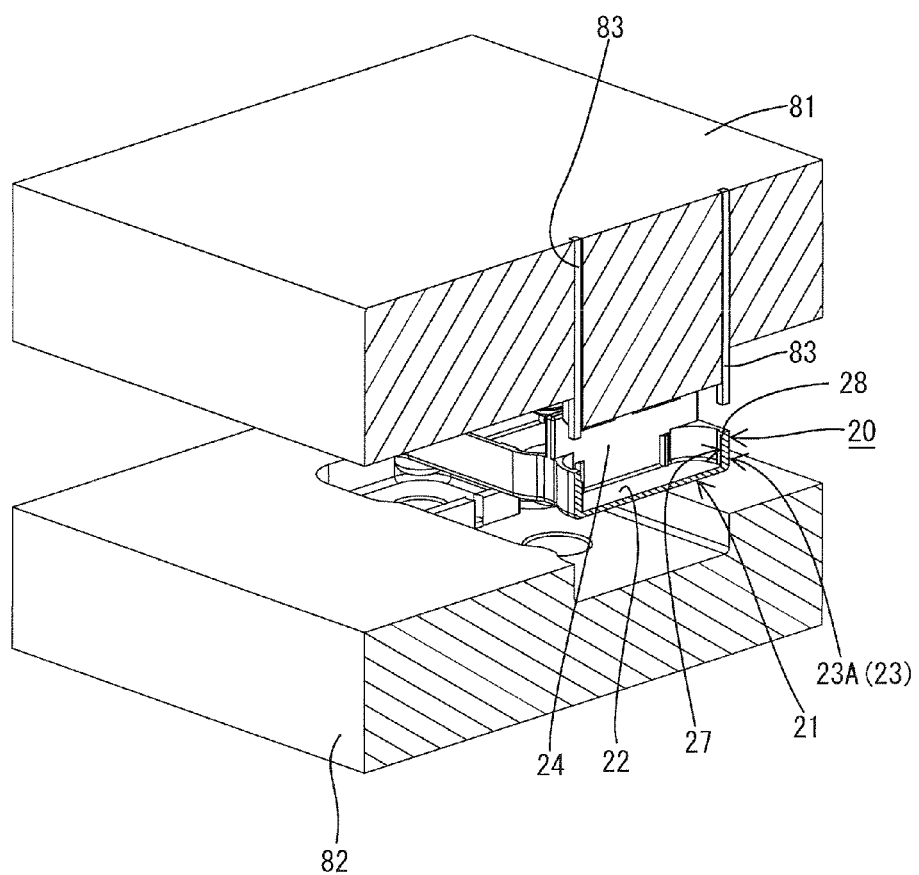
FIG. 17 is a perspective view with a section showing a state where the insulating plate is separated from the first and second molds.

The pressing projections 27 extend substantially vertically and are formed over substantially the entire height of the outer surrounding walls 23A. Upper end surfaces of the pressing projections 27 are substantially flush with upper ends of the outer surrounding walls 23A, as shown in FIG. 17. Further, the outer surrounding walls 23A are thicker at the pressing projections 27.

At least one first pressing surface 28 is formed on the upper end surface of each pressing projection 27 and the upper end surface of the outer surrounding wall 23A substantially flush with and adjacent to the pressing projection 27. Note that, in the first pressing surface 28, the upper end surfaces of the surrounding wall 23 and the pressing projection 27 have substantially the same area.

Figure 6:
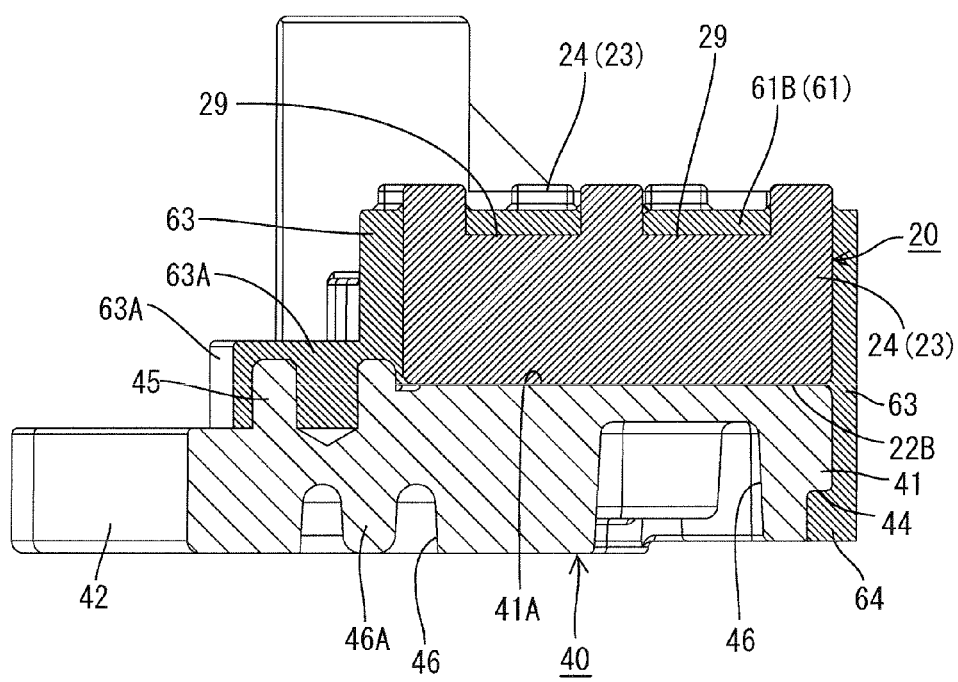
FIG. 6 is a section along VI-VI of FIG. 2.

As shown in FIG. 8, substantially rectangular second pressing surfaces 29 are formed on the upper ends of the partition walls 24. As shown in FIGS. 6 and 13, the second pressing surfaces 29 are formed by recessing the substantially opposite sides of a center of an upper end portion of each partition wall 24 in a long side direction.

Figure 18:
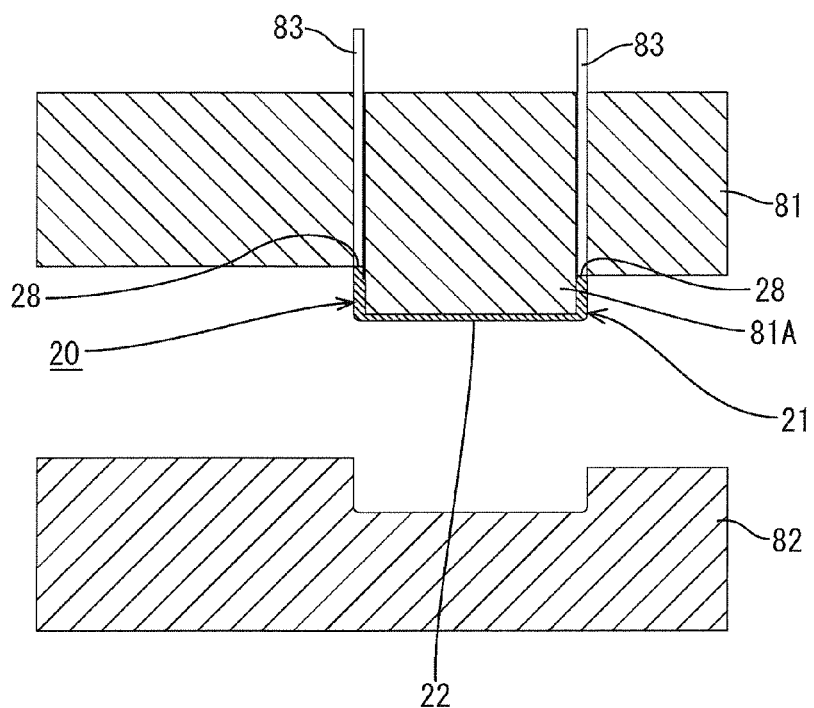
FIG. 18 is a section showing a state where nut accommodating recesses are fitted to the first mold.

The first and second pressing surfaces 28, 29 are to be pressed by respective ejector pins 83 in molds 81, 82, as shown in FIGS. 17 and 18, when the insulating plate 20 is separated from the molds 81, 82 after being formed by the molds 81, 82 that are moved relatively for molding opening. Specifically, the insulating plate 20 is formed by the first mold 81 arranged at a first side and the second mold 82 arranged at another side (e.g. a lower side). The first mold 81 forms a first side of the insulating plate 20 and the second mold 82 forms a second side of the insulating plate 20. The insulating plate 20 is formed by injecting resin into a cavity formed by the first and second molds 81, 82, and completed by being separated from the first and second molds 81, 82 after this resin is cured.

Figure 19:
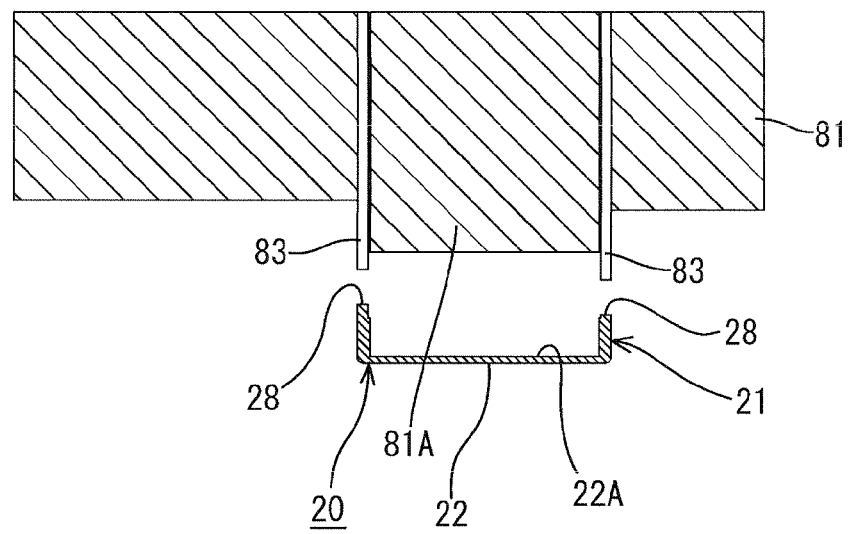
FIG. 19 is a section showing the insulating plate is separated from the first mold.

The nut accommodating recesses 21 of the insulating plate 20 are formed by accommodating-portion forming parts 81A in the first mold 81. These nut accommodating recesses 21 contract during curing and fit to the accommodating-portion forming parts 81A, as shown in FIG. 18. Therefore, the nut accommodating recesses 21 are difficult to demold. The ejector pins 83 in the first mold 81 press the respective first and second pressing surfaces 28, 29 to separate the nut accommodating recesses 21 from the accommodating-portion forming parts 81A and separate the insulating plate 20 from the first mold 81, as shown in FIGS. 17 and 19. In this way, the insulating plate 20 is separated from the first mold 81 by pressing the first and second pressing surfaces 28, 29 instead of the base plate 22. The ejector pins do not form indents on the surface of the bottom plate 22. Accordingly, air layers having lower thermal conductivity than metals or synthetic resins are not formed between the nuts 10 and the bottom plate 22. Therefore, the insulating plate 20 is held in close contact with the nuts 10 and the bottom plate 22 to improve heat transfer from the nuts 10 to the insulating plate 20.

The first and second pressing surfaces 28, 29 are formed intermittently on the surrounding wall 23. Thus, the forces of the ejector pins 83 are distributed among the first and second pressing surfaces 28, 29 so that the bottom plate 22 of the insulating plate 20 will not be deformed when the insulating plate 20 is separated from the first mold 81.

Further, the first and second pressing surfaces 28, 29 are formed on the upper surfaces of the surrounding walls 23 and the upper surfaces of the partition walls 24. Thus, it is not necessary to form separate pressing surfaces on the insulating plate 20 and the insulating plate 20 can be small and simple.

Furthermore, the synthetic resin used for the insulating plate 20 has a content of glass and talc between about 50% and about 75% (e.g. about 66%). Therefore, warping is less likely to occur after molding as compared to synthetic resin having a content of glass and talc of about 33%. As a result, the bottom plate 22 of the insulating plate 20 will be held in close contact with the nuts 20 and heat transfer from the nuts 10 to the bottom plate 22 is improved further improved.

Positioning ribs 25 are provided on the inner peripheral surface of the surrounding wall 23 and project into the nut accommodating recess 21 so that projecting ends of the positioning ribs 25 can contact the side surfaces of the nut 10 accommodated in the nut accommodating portion 21. The positioning ribs 25 of the outer surrounding walls 23A extend substantially straight up from the bottom plate 22 and continue over substantially the entire height of the outer surrounding wall 23A. The positioning ribs 25 on the partition wall 24 extend substantially straight up from the bottom plate 22 to a substantially vertical central portion of the partition wall 24.

As shown in FIG. 8, two spaced apart positioning ribs 25 are provided on the inner surface at each of four sides of the surrounding wall 23 in each smaller nut accommodating recess 21A. Further, two spaced apart positioning ribs 25 are provided on the inner surface of each longer side of the surrounding wall 23 in each larger nut accommodating recess 21B and three spaced apart positioning ribs 25 are provided on the inner surface of each shorter side thereof. The positioning ribs 25 on the outer longer sides of the surrounding walls 23 in the smaller nut accommodating recesses 21A are formed laterally of the pressing projections 27 and those on the shorter sides of the surrounding walls 23 in the smaller nut accommodating recesses 21A are formed on the pressing projections 27. Further, two of the positioning ribs 25 on each shorter side of the surrounding wall 23 in each larger nut accommodating recess 21B are laterally of side surfaces of the pressing projections 27. In this way, the nuts 10 accommodated in the nut accommodating recesses 21 are positioned accurately by a plurality of positioning ribs 25 as shown in FIG. 14.

A bottomed bolt escaping recess 26 extends down in a substantially central part of the bottom plate 22 enclosed by the surrounding wall 23. As shown in FIGS. 5 and 8, the bolt escaping recess 26 makes a circular opening in the upper surface 22A of the bottom plate 22. The bottom plate 22 and the bolt escaping recesses 26 have a substantially uniform thickness. Accordingly, each bolt escaping recess 26 has a substantially has a cylindrical outer surface projecting down from the lower surface 22B of the bottom plate 22, as shown in FIGS. 9 and 10.

As shown in FIG. 5, the bolt escaping recess 26 is substantially coaxial with the bolt tightening hole 11 of the nut 10 and the inner diameter of the bolt escaping recess 26 is slightly larger than the inner diameter of the bolt tightening hole 11. Thus, the nut 10 will not interfere with the bottom plate 22 of the insulating plate 20 and the bolt will not break the insulating plate 20 when the bolt is screwed into the nut 10 and enters the bolt tightening hole 11.

Figure 11:
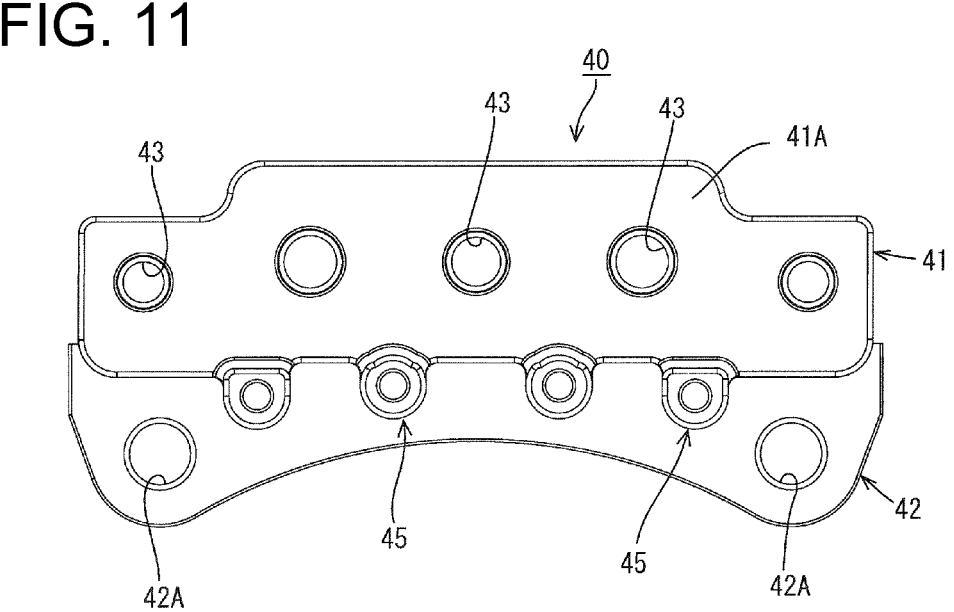
FIG. 11 is a plan view of a heat sink.

The heat sink 40 is produced of a material having a higher heat capacity than the remaining parts of the terminal block, such as aluminum die-cast, and has a laterally long shape, as shown in FIG. 11. The heat sink 40 includes a sink main body 41 on which the insulating plate 20 is to be placed, and a fixing portion 42 unitary with the sink main body 41 and projects from one longer side edge of the sink main body 41.

The upper surface 41A of the sink main body 41 is flat and/or polished to have no irregularities and the insulating plate 20 is placed on an upper surface 41A of the sink main body 41. Thus, the lower surface 22B of the bottom plate 22 of the insulating plate 20 and the upper surface 41A of the sink main body 41 can be held in close contact, as shown in FIG. 5.

The sink main body 41 is formed with five bottomed accommodation recesses 43 arranged at substantially equal intervals in the lateral direction. The accommodation recesses 43 make substantially circular openings in the upper surface 41A of the sink main body 41 and extend down from the upper surface 41A of the sink main body 41, as shown in FIG. 5. The bolt escaping recesses 26 of the insulating plate 20 can be inserted in the accommodation recesses 43 with small clearances formed between the outer surfaces of the bolt escaping recesses 26 and the inner peripheral surfaces of the accommodation recesses 43. Thus, the insulating plate 20 and the heat sink 40 can be assembled while being positioned with respect to each other by fitting the respective bolt escaping recesses 26 of the insulating plate 20 into the corresponding accommodation recesses 43.

Figure 12:
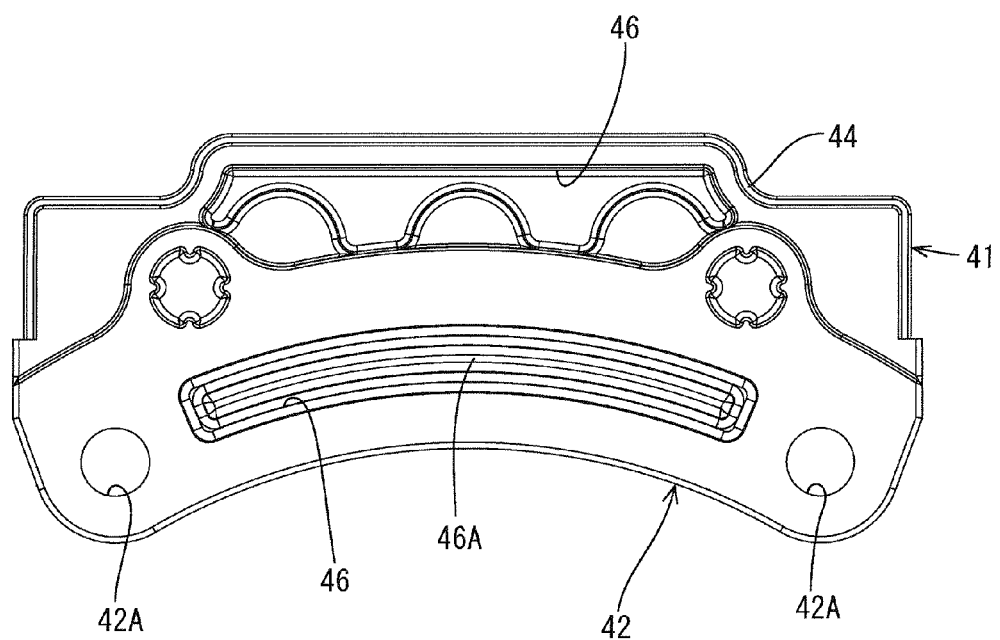
FIG. 12 is a bottom view of the heat sink.

An outer step 44 is formed at the outer peripheral edge of a lower end portion of the sink main body 41 and is somewhat above the lower surface of the sink main body 41. As shown in FIG. 12, the outer step 44 is formed over substantially the entire outer periphery except at a part of the sink main body 41 connected to the fixing portion 42.

The fixing portion 42 is laterally long along the side surface of the sink main body 41. Further, bolt insertion holes 42A vertically penetrate substantially opposite lateral sides of the fixing portion 42. Substantially cylindrical projections 45 extend vertically from the upper surface of the fixing portion 42. As shown in FIG. 6, the cylindrical projections 45 are connected to the side surface of the sink main body 41 facing the fixing portion 42, and extend up to a position slightly above the upper surface 41A of the sink main body 41. Each cylindrical projection 45 defines a bottomed recess with an open upper end.

As shown in FIG. 12, recesses 46 are formed in the lower surfaces of the sink main body 41 and the fixing portion 42. At least one heat radiation fin 46A is formed in the recess of the fixing portion 42, and cooling water or fluid may be circulated to contact the fin 46A. In this way, a heat radiation property from the heat sink 40 is improved by increasing the surface area of the lower surface of the heat sink 40 by the recess 46 and cooling the heat sink 40 by the heat radiation fin 46A.

Figure 1:
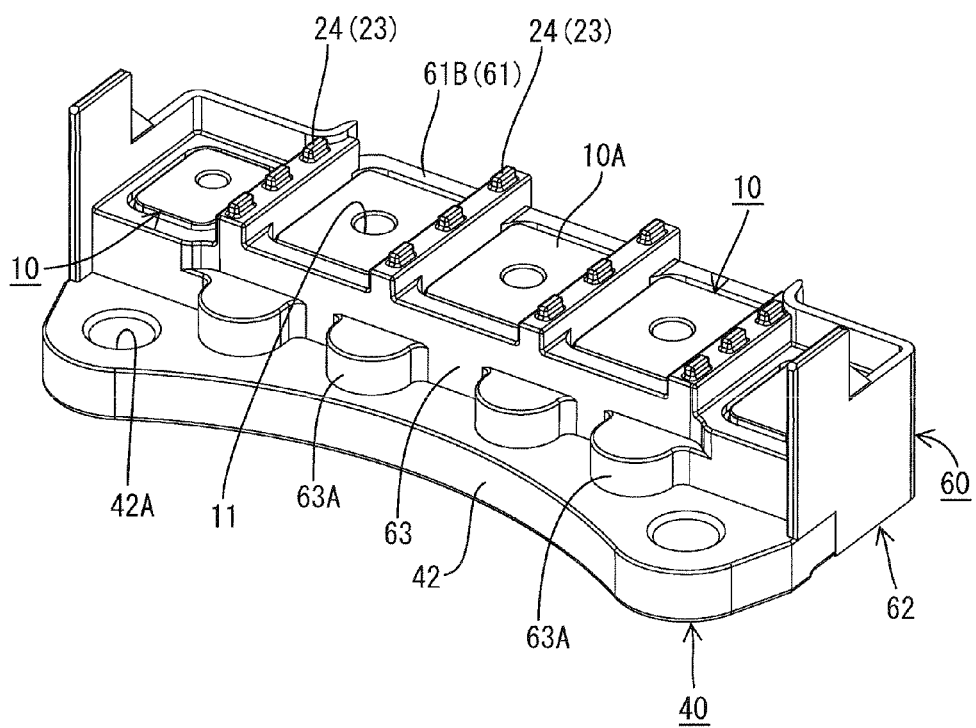
FIG. 1 is a perspective view of a terminal block.
Figure 3:
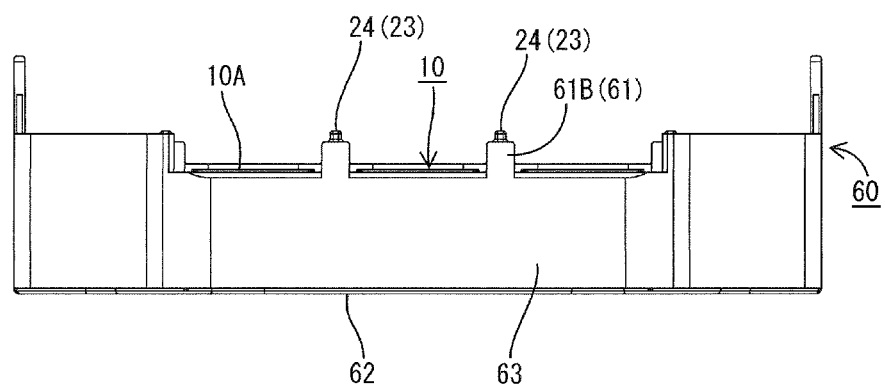
FIG. 3 is a rear view of the terminal block.

The molded resin 60 is a synthetic resin and, as shown in FIGS. 1 and 5, partly covers the nuts 10, the insulating plate 20 and the heat sink 40. The molded resin 60 includes an upper cover 61 that closely contacts the steps 12 of the nuts 10 and the upper end portions of the surrounding walls 23 of the insulating plate 23, a lower fixing portion 62 that closely contacts the outer step 44 of the heat sink 40, and a side wall 63 that closely contacts the insulating plate 20 and the outer side surfaces of the sink main body 41 of the heat sink 40. Further, as shown in FIG. 3, the side wall 63 unitarily connects the upper and lower covers 61, 62.

Figure 20:
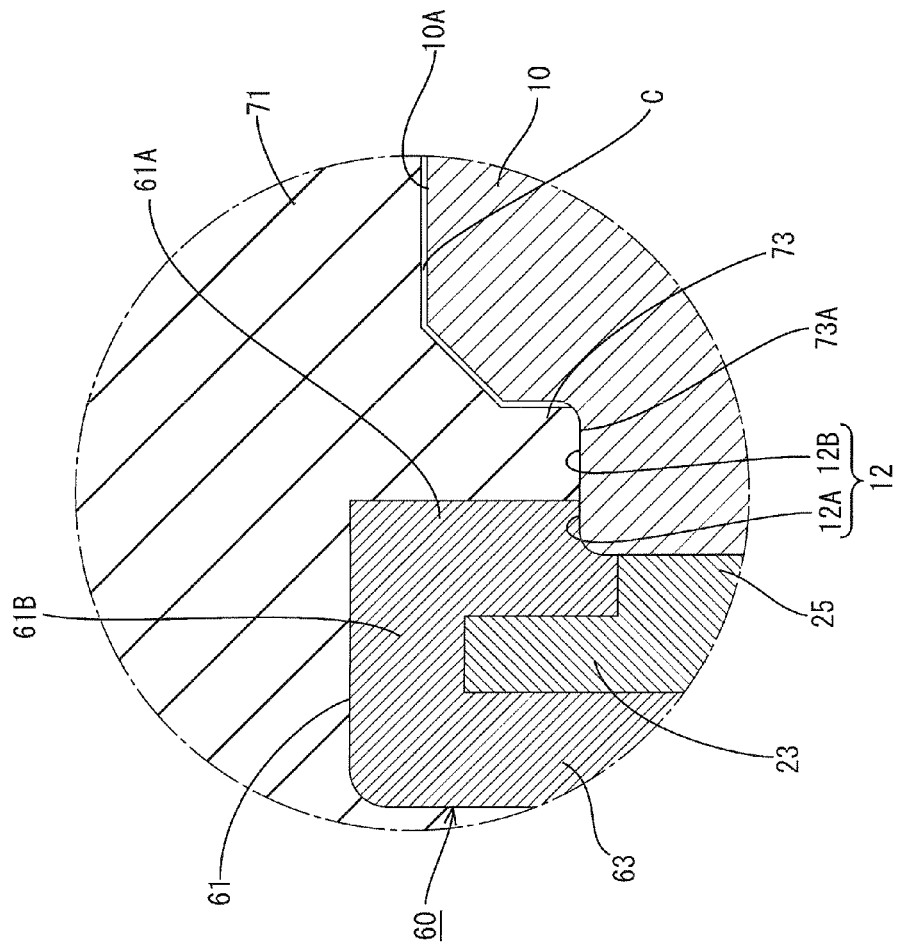
FIG. 20 is an enlarged section showing a state where a resin cut-off part in the first mold of FIG. 16 is pressing a press surface of a stepped portion.

As shown in FIG. 5, the upper cover 61 includes nut covers 61A that cover the outer peripheral edges of the upper surfaces of the steps 12 of the respective nuts 10 over substantially the entire peripheries and surrounding wall covers 61B that cover the upper ends of the surrounding walls 23. The steps 12 include restricted surfaces 12A that are covered by the nut covers 61A and are held in close contact with the nut covers 61A, as shown in FIG. 20. Further, the surrounding wall covers 61B cover the upper ends of the respective surrounding walls 23 over substantially the entire peripheries except at parts of the partition walls 24. The respective nut covers 61A and the surrounding wall covers 61B of the upper cover 61 are formed unitarily and cover parts of the nuts 10 and surrounding walls 23. Note that, as shown in FIGS. 3 and 6, the parts of the partition walls 24 are exposed at the upper end surfaces of the surrounding wall covers 61B. That is the nut covers 61A cover the restricted surfaces 12A from above to prevent upward movements of the nuts 10. Thus, the nuts 10 and the insulating plate 20 are held in close contact while preventing lifting movements of the nuts 10 being pulled toward the bolts and preventing insulating or air layers having lower thermal conductivity than metals and synthetic resins from being formed between the nuts 10 and the insulating plate 20 when the bolts are tightened into the bolt tightening holes 11. Consequently, heat easily can escape from the nuts 10 to the heat sink 40 via the insulating plate 20 and heat-transfer performance of the terminal block can be improved.

The nut covers 61A and the surrounding wall covers 61B are formed unitarily as shown in FIG. 5. Thus, rigidity of the upper cover 61 can be increased as compared with the case where they are formed separately.

Figure 4:
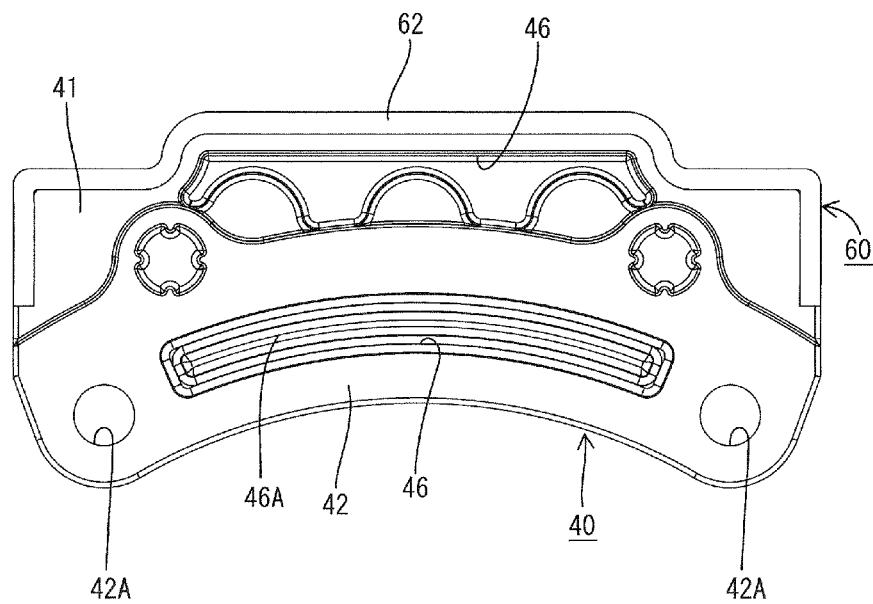
FIG. 4 is a bottom view of the terminal block.

As shown in FIGS. 4 and 5, the lower cover 62 covers the outer step 44 of the sink main body 41 of the heat sink 40 over substantially the entire range from below. In this way, the molded resin 60 sandwiches the nuts 10, the insulating plate 20 and the heat sink 40 in close contact, as shown in FIGS. 5 and 6. Thus, the nut covers 61A will not be lifted up together with the nuts 10 that are pulled toward the bolts and keeps the nuts 10, the insulating plate 20 and the heat sink 40 in close contact.

The upper cover 61 substantially fills the clearances between the inner peripheral surfaces of the surrounding walls 23 of the nut accommodating recesses 21 and the side surfaces of the nuts 10, thereby improving adhesion between the molded resin 60, the nuts 10 and the insulating plate 20. Thus, the nuts 10 closely contact the molded resin 60 over substantially the entire peripheries at both the nut covering portions 61A and the outer peripheral surfaces of the nuts 10 for preventing upward movements of the nuts.

As shown in FIGS. 3 and 5, the side wall 63 entirely covers the side surfaces of the insulating plate 20 and the side surfaces of the sink main body 41 of the heat sink 40 between the upper cover 61 and the lower cover 62. As shown in FIG. 6, the side wall 63 has projection covers 63A that cover the cylindrical projections 45 of the heat sink 40. The projection covers 63A fill the interiors of the cylindrical projections 45 and entirely cover the upper surfaces and side surfaces of the cylindrical projections 45 to improve adhesion between the molded resin 60 and the heat sink 40.

Figure 15:
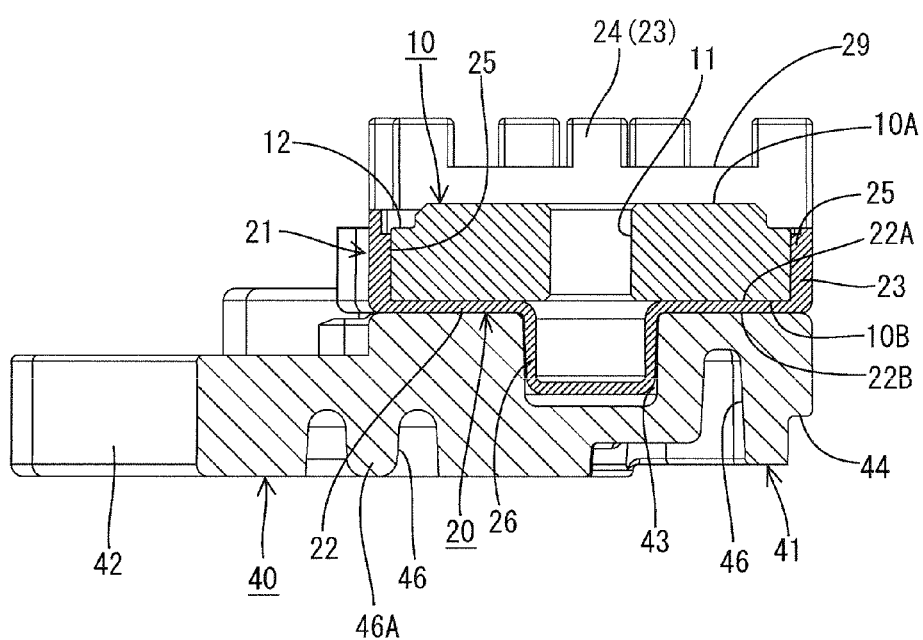
FIG. 15 is a section along XV-XV of FIG. 14.
Figure 16:
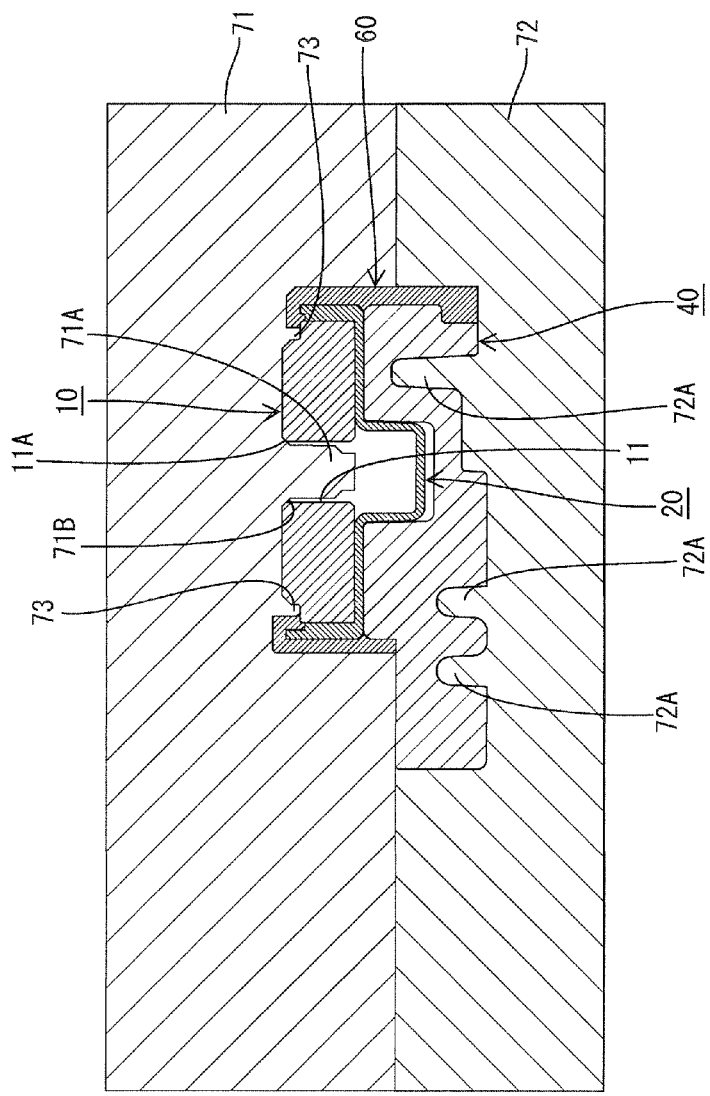
FIG. 16 is a section showing a state where a terminal block is molded in first and second block molds.

The terminal block is manufactured by initially placing the nuts 10 in the nut accommodating recesses 21 of the insulating plate 20 and the bolt escaping recesses 26 of the nut accommodating recesses 21 are fit into the respective accommodation recesses 43 of the heat sink 40. Thus, the nuts 10, the insulating plate 20 and the heat sink 40 are assembled and positioned, as shown in FIGS. 14 and 15, and are set in first and second block molds 71, 72, which are moved vertically or relatively for mold opening, as shown in FIG. 16. At this time, the nuts 10, the insulating plate 20 and the heat sink 40 have upper parts supported by the first block mold 71 and lower parts supported by the second block mold 72. Further, the first block mold 71 forms the upper cover 61 of the molded resin part 60 and an upper part of the side wall 63 and the second block mold 72 forms the lower cover 62 and a lower part of the side wall 63.

The first block mold 71 includes resin cut-off parts 73 that press the respective nuts 10 from above. Each resin cut-off part 73 has a substantially tubular shallow cylindrical shape. As shown in FIGS. 16 and 20, a leading end surface 73A of each resin cut-off part 73 is substantially perpendicular to a mold opening direction of the first block mold 71 and can come into surface contact with the upper surface of the step 12 of the nut 10. A thickness of the leading end surface 73A of the resin cut-off part 73 is smaller than a depth of the step 12 of the nut 10 parallel to the upper and lower surfaces 10A, 10B.

The resin cut-off parts 73 are set to support the respective nuts 10 from above by pressing press surfaces 12B, which are intermediate parts of the steps 12 of the nuts 10, from above over substantially the entire peripheries when the nuts 10, the insulating plate 20 and the heat sink 40 are set in the first and second block molds 71, 72.

The nuts 10 are pressed only by the resin cut-off parts 73 when set in the first and second block molds 71, 72 and small clearances C are formed between the first block mold 71 and the upper fastening surfaces 10A of the nuts 10 and between the inner peripheral surfaces of the resin cut-off parts 73 and the side surfaces of the nuts 10, as shown in FIG. 20. These clearances prevent the upper fastening surfaces 10A of the nuts 10 from being brought into contact with and damaged by the first block mold 71. Further, the clearances C ensure that the leading end surfaces 73A of the resin cut-off parts 73 can be brought into surface contact with the upper surfaces of the steps 12 of the nuts 10 even when the nuts 10 are displaced slightly horizontally with respect to the resin cut-off parts 73. Thus, displacements of the nuts 10 can also be dealt with.

On the other hand, the second block mold 72 is set to support and position the heat sink 40 by being fit into the recess 46 in the lower surface of the heat sink 40.

The bottom plate 22 of the insulating plate 20 is formed not to have even small irregularities. Thus, the nuts 10, the insulating plate 20 and the heat sink 40 can be set in the first and second block molds 71, 72 so that the upper surface 22A of the bottom plate 22 closely contacts the lower fastening surfaces 10B of the nuts 10 and so that the lower surface 22A and 22B of the bottom plate 22 closely contacts the upper surface 41A of the sink main body 41 of the heat sink 40.

The nuts 10, the insulating plate 20 and the heat sink 40 are positioned in the first and second block molds 71, 72 without being displaced. Specifically, the heat sink 40 is positioned with respect to the second block mold 72 by inserting a positioning projection 72A of the second block mold 72 into the recess 46 of the heat sink 40 as shown in FIG. 16. Further, the insulating plate 20 is positioned on the heat sink 40 and the nuts 10 are positioned on the insulating plate 20 to prevent the positioning pins 71A from being displaced from the bolt tightening holes 11 sufficiently to break the nuts 10 and the positioning pins 71A when the positioning pins 71A of the first block mold 71 are inserted into the bolt tightening holes 11 of the nuts 10 from above. Note that the nuts 10 are accommodated in a slightly loose state in the nut accommodating recesses 21 before being fixed by the positioning pins 71A The taper surfaces 11A at the upper inner peripheral edges of the bolt tightening holes 11 of the nuts 10 and the inclined surfaces 71B at the positioning pins 71A permit slight relative corrective displacements of the positioning pins 71A and the bolt tightening holes 11 of the nuts 10 when the first and second block molds 71, 72 are closed, as shown in FIG. 16.

Resin then is injected into a cavity formed by the first and second block molds 71, 72 to form the molded resin 60 shown in FIG. 16. At this time, the nuts 10 are pressed only by the leading end surfaces 73A of the resin cut-off parts 73. Thus, when a mold clamping force of the first block mold 71 acting on the second block mold 72 is constant, contact pressures between the resin cut-off parts 73 and the steps 73 can be increased by as much as contact areas are made smaller as compared to contact pressures when the entire upper fastening surface 10A of the nuts 10 are pressed by the resin cut off parts 73. This enables the flow of the resin to be cut off easily at boundary parts between the leading end surfaces 73A of the resin cut-off parts 73 and the press surfaces 12B of the steps 12 without increasing the mold clamping force and resin films on the upper fastening surfaces 10A of the nuts 10 can be prevented.

The leading end surfaces 73A of the resin cut-off parts 73 and the press surfaces 12B of the steps 12 of the nuts 10 are in surface contact. Thus, the flow-in of the resin can be made more difficult by as much as the thickness of the resin cut-off parts 73 and resin films will not form on the upper fastening surfaces 10A of the nuts 10.

Even if a clearance is formed at the boundary between the press surface 12B of the step 12 and the leading end surface 73A of the resin cut-off part 73 e.g. due to a processing error of the nut 10 or the like and the resin flows into this clearance, the flow of the resin to the upper fastening surface 10A of the nut 10 is restricted since the upper surface of the step 12 is slightly below the upper fastening surface 10A of the nut 10.

The side surfaces of the nuts 10 can be held in contact only with the positioning ribs 25 on the inner peripheral surfaces of the surrounding walls 23 of the insulating plate 20. Thus, clearances are formed between the inner peripheral surfaces of the surrounding walls 23 and the side surfaces of the nuts 10 and the resin can flow into these clearances. This enables the nuts 10 and the insulating plate 20 to be fixed without any backlash by holding the nuts 10, the insulating plate 20 and the molded resin part 60 in closer contact.

Finally, when the resin is cured, the first and second block molds 71, 72 are moved vertically in opposite directions for mold opening, to complete the terminal block.

As described above, the contact pressure between the resin cut-off part 73 and the step 12 can be increased and the flow of the resin easily can be cut off at the boundary parts between the resin cut-off part 73 and the step 12 without increasing the mold clamping force since the resin cut-off part 73 presses only the press surface 12B of the step 12.

Even if a clearance is formed at the boundary between the step 12 and the resin cut-off part 73 and the resin flows into this clearance, the flow of the resin to the upper fastening surface 10A of the nut 10 can be prevented since the upper surface of the step 12 is lower than the upper fastening surface 10A of the nut 10. Thus, a resin film will not be formed on the upper fastening surface 10A of the nut 10 and heat radiation performance of the busbars and the terminal block are improved by efficiently transferring heat of the busbars to the nuts 10.

The restricted surface 12A of the step 12 of each nut 10 is covered from above by the upper cover 61 of the molded resin 60. Thus, lifting movements of the nuts 10 are prevented and the nuts 10 and the insulating plate 20 are held in close contact when the bolts are tightened into the nuts 10. Therefore, heat-transfer performance of the terminal block can be improved further.

Further, the upper cover 61 of the molded resin 60 covers a part of the step 12 outward from the outer peripheral edge parts of the step 12 pressed by the resin cut-off part 73. Thus, the shape of the nuts 10 can be simplified as compared with the case where the press surfaces 12B to be pressed by the resin cut-off parts 73 and the restricted surfaces 12A to be covered from above by the upper covers 61 are formed separately.

The invention is not limited to the above described and illustrated embodiment. For example, the following embodiments are also included in the scope of the invention.

Although the nut 10 is in the form of a block having a substantially rectangular plan view in this embodiment, the present invention is not limited to such a mode. For example, the nut may be formed to have a substantially cylindrical or polygonal shape.

Although the lower surface of the heat sink 40 is covered by the lower covering portion 62 of the molded resin part 60 in this embodiment, the present invention is not limited to such a mode. For example, a recess may be formed in the side surface of the heat sink 40 and a locking portion to be engaged with this recess may be provided on the molded resin part 60.

Although the leading end surfaces 73A of the resin cut-off parts 73 and the press surfaces 12B of the stepped portions 12 of the nuts 10 are horizontal surfaces substantially perpendicular to the mold opening direction of the mold in this embodiment, the present invention is not limited to such a mode. For example, the leading end surfaces of the resin cut-off parts and the press surfaces 12B of the stepped portions 12 of the nuts 10 may be oblique surfaces or surfaces arranged at an angle different from 0° or 180° to the mold opening direction of the mold.

What is claimed is:

1. A terminal block in which a plurality of conductors extending from one or more devices are to be placed one over another and fastened by a bolt, comprising:
   at least one nut with opposite first and second fastening surfaces, at least one step at an outer peripheral part of the first fastening surface and recessed away from the first fastening surface;
   at least one insulating plate in close contact with the second fastening surface of the nut at sink;
   at least one heat sink in close contact with a surface of the insulating plate opposite the nut so that heat of the conductors is transferred to the heat sink via the insulating plate; and
   resin molded integrally around parts of the nut, the insulating plate and the heat sink, the resin covering a restricting surface of the step spaced outward from the first fastening surface and being substantially absent from a press surface extending between the restricting surface of the step and the first fastening surface.

2. The terminal block of claim 1, wherein the step extends around an entire periphery of the first fastening surface.

3. The terminal block of claim 2, wherein the restricting surface of the step is substantially coplanar with the press surface.

4. The terminal block of claim 1, wherein the resin includes an upper cover covering the restricted surface of the step, a lower cover that covers a surface of the heat sink opposite the insulating plate, and a side wall connecting the upper and lower covers.

5. The terminal block of claim 4, wherein the nut, the insulating plate and the heat sink are sandwiched from opposite sides by the upper and lower covers while being held in close contact.

6. The terminal block of claim 5, wherein the step is configured for surface contact with a resin cut-off part of a mold.

7. The terminal block of claim 6, wherein the resin cut off part has a horizontal leading end surface at an angle different from 0° or 180°, preferably substantially perpendicular to a mold opening direction of the mold.

8. The terminal block of claim 1, wherein the press surface of the step is substantially planar and substantially parallel to the first fastening surface and a clearance being formed between the press surface a side surface of the resin cut-off part and a side surface of the nut.

9. A method of manufacturing a terminal block in which a plurality of conductors extending from one or more devices are to be placed one over another and fastened by a bolt, the method comprising:
   providing at least one nut with a fastening surface on which the conductors are to be placed and at least one step at an outer periphery of the fastening surface and recessed from the fastening surface;
   arranging at least one insulating plate in close contact with a surface of the nut opposite the fastening surface;
   arranging at least one heat sink on a side of the insulating plate opposite the nut;
   pressing a resin cut-off part of a mold against a portion of the step inward from an outer periphery of the nut so that a restricted surface is defined between the resin cut-off part and the outer periphery of the nut; and
   molding resin around the insulating plate, the heat sink, the outer periphery of the nut and the restricted surface of the nut.

10. The method of claim 9, wherein the step is formed entirely around the outer periphery of the fastening surface, and wherein the resin cut-off part presses the step around the entire outer periphery of the fastening surface.

11. The method of claim 9, wherein the step of molding resin includes forming:
   an upper cover that covers the restricted surface of the step from above;
   a lower cover that covers a surface of the heat sink opposite the insulating plate; and
   a side wall connecting the upper and lower covers.

12. The method of claim 11, wherein the nut, the insulating plate and the heat sink are sandwiched from opposite sides by the upper and lower covers while being respectively held in close contact.

13. The method of claim 9, wherein the step of pressing the resin cut-off part of a mold against a portion of the step inward from an outer periphery of the nut comprises establishing surface contact between the resin cut-off part of the mold and the step.

14. The method of claim 9, wherein the step of pressing the resin cut-off part of a mold against a portion of the step inward from an outer periphery of the nut comprises pressing against a press surface of the step a leading end surface of the resin cut-off part that is aligned substantially perpendicular to a mold opening direction of the mold to achieve surface contact between the press surface of the step and the leading end surface of the resin cut-off part at a position so that a clearance is formed between a side surface of the resin cut-off part and a side surface of the nut.

* * * * *